(12) United States Patent
Huang et al.

(10) Patent No.: US 11,527,233 B2
(45) Date of Patent: Dec. 13, 2022

(54) METHOD, APPARATUS, DEVICE AND COMPUTER STORAGE MEDIUM FOR GENERATING SPEECH PACKET

(71) Applicant: Baidu Online Network Technology (Beijing) Co., Ltd, Beijing (CN)

(72) Inventors: Jizhou Huang, Beijing (CN); Ying Li, Beijing (CN); Yongzhi Ji, Beijing (CN); Lei Jia, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 286 days.

(21) Appl. No.: 16/988,354

(22) Filed: Aug. 7, 2020

(65) Prior Publication Data
US 2021/0082394 A1 Mar. 18, 2021

(30) Foreign Application Priority Data
Sep. 16, 2019 (CN) .......................... 201910870412.3

(51) Int. Cl.
*G10L 13/047* (2013.01)
*G06F 3/16* (2006.01)
(Continued)

(52) U.S. Cl.
CPC ............ *G10L 13/047* (2013.01); *G06F 3/167* (2013.01); *G10L 15/22* (2013.01); *G10L 15/30* (2013.01); *G10L 25/60* (2013.01)

(58) Field of Classification Search
USPC .................................................. 704/1–504
See application file for complete search history.

(56) References Cited

U.S. PATENT DOCUMENTS 6,640,145 B2 * 10/2003 Hoffberg ................. G06K 9/62
709/200
7,573,907 B2 * 8/2009 Lakaniemi ............ H04J 3/0632
370/468
(Continued)

FOREIGN PATENT DOCUMENTS

CN 103021402 A 4/2013
CN 104992704 A 10/2015
(Continued)

OTHER PUBLICATIONS

First Office Action for Chinese Patent Application 2001910870412.3 dated Jul. 29, 2020, and its English translation provided by Google Translate.
(Continued)

*Primary Examiner* — Marcus T Riley
(74) *Attorney, Agent, or Firm* — Ladas & Parry, LLP

(57) ABSTRACT

A method, device and computer storage medium for generating a speech packet which relates to the technical field of speech are disclosed. The method may include: providing a speech recording interface to a user; obtaining speech data entered by the user after obtaining an event of triggering speech recording on the speech recording interface; uploading the speech data to a server side in response to determining that the speech data meets requirements for training a speech synthesis model; receiving a downloading address of the speech packet generated by the server side after training the speech synthesis model with the speech data. An ordinary user may customize a personalized speech packet through the speech recording interface provided by the client, without using professional recording equipment, which may substantially reduce the production cost of the speech packet.

19 Claims, 8 Drawing Sheets

(51) Int. Cl.
*G10L 15/22* (2006.01)
*G10L 15/30* (2013.01)
*G10L 25/60* (2013.01)

(56) References Cited

U.S. PATENT DOCUMENTS

| | | | |
|---|---|---|---|
| 10,276,170 B2* | 4/2019 | Gruber | G10L 17/22 |
| 10,650,621 B1* | 5/2020 | King | H04L 67/12 |
| 2008/0021721 A1* | 1/2008 | Jones | G06Q 50/2057 |
| | | | 434/350 |
| 2015/0100318 A1* | 4/2015 | Rajagopalan | G10L 19/005 |
| | | | 704/258 |
| 2015/0248881 A1* | 9/2015 | Holdren | G10L 15/06 |
| | | | 704/260 |
| 2019/0221202 A1 | 7/2019 | Li et al. | |
| 2019/0251952 A1 | 8/2019 | Arik et al. | |
| 2021/0082394 A1* | 3/2021 | Huang | G10L 25/60 |

FOREIGN PATENT DOCUMENTS

| | | |
|---|---|---|
| CN | 105261355 A | 1/2016 |
| CN | 106971709 A | 7/2017 |
| CN | 108806665 A | 11/2018 |
| CN | 108962284 A | 12/2018 |
| CN | 109036374 A | 12/2018 |
| CN | 110136693 A | 8/2019 |
| JP | 2007140002 A | 6/2007 |

OTHER PUBLICATIONS

Search Report for Chinese Patent Application 2001910870412.3 dated Jul. 22, 2020, and its English translation provided by Google Translate.
Notification to Grant Patent Right for Invention and search report from CN app. No. 201910870412.3, dated Apr. 8, 2021, with English translation from Global Dossier, all pages.

* cited by examiner

METHOD, APPARATUS, DEVICE AND COMPUTER STORAGE MEDIUM FOR GENERATING SPEECH PACKET

RELATED APPLICATIONS

The present application claims the priority of Chinese Patent Application No. 201910870412.3, filed on Sep. 16, 2019. The disclosure of the foregoing application is incorporated herein by reference in its entirety.

TECHNICAL FIELD

The present disclosure generally relates to the technical field of computer application, and particularly to a method, apparatus, device and computer storage medium for generating a speech packet in the technical field of speech.

BACKGROUND

As computer technologies develop constantly and people's requirements for products are increasing constantly, there arises a function of using a speech synthesis technique in computer application products to provide different speakers' voice broadcast. For example, in map-like products, when navigation voice broadcast is needed, the user may select different speakers provided by map-like products for navigation voice broadcast. These speakers are usually for example famous persons such as movie or TV actors, crosstalk comedians and singers. These famous persons need to be invited before professional recording equipment to record speech. For example, as for navigation-like applications, tens of thousands of pieces of commonly-used speech during navigation needs to be recorded, and then the recorded speech is used to generate a speech packet to be downloaded by a client. When broadcast is needed during navigation, corresponding speech is found from the speech packet and concatenated to obtain a broadcast text.

However, the existing manner of generating the speech packet has the following drawbacks: on the one hand, professional recording equipment are needed to record tens of thousands of speech, and the speech is manually put online to specific application service terminals, which requires high costs and a long production period; on the other hand, if the user hopes to generate a personalized speech packet using for example his own voice or family member's voice, this cannot be realized.

SUMMARY

In view of the above, the present disclosure provides a method, apparatus, device and computer storage medium for generating a speech packet, to facilitate the reduction of costs and conveniently achieve the generation of personalized speech packets with ordinary users' speech.

In a first aspect, the present disclosure provides a method for generating a speech packet, implemented in client, and the method may include:

providing a speech recording interface to a user;

obtaining speech data entered by the user after obtaining an event of triggering speech recording on the speech recording interface;

uploading the speech data entered by the user to a server side in response to determining that the speech data entered by the user meets requirements for training a speech synthesis model; and receiving a downloading address of the speech packet generated by the server side after training the speech synthesis model with the speech data.

According to an embodiment of the present disclosure, the event of triggering speech recording may include:

detecting a gesture of triggering speech recording on the speech recording interface; or receiving a speech instruction of triggering speech recording from the user when the speech recording interface is displayed.

According to an embodiment of the present disclosure, the obtaining speech data entered by the user may include:

displaying on the speech recording interface a preset text sentence and/or playing a voicing sentence corresponding to a text sentence; and obtaining the speech data entered by the user according to the preset text sentence and/or voicing sentence displayed.

According to an embodiment of the present disclosure, the method may further include:

obtaining a speech recognition result by recognizing the speech data entered by the user; and comparing the speech recognition result with the preset text sentence to judge whether the speech data entered by the user meets a recording quality requirement.

According to an embodiment of the present disclosure, the requirements for training the speech synthesis model includes at least one of:

the speech data entered by the user meets a recording quality requirement; or an amount of the speech data entered by the user meets a preset amount requirement.

According to an embodiment of the present disclosure, the uploading the speech data entered by the user to a server side in response to determining that the speech data entered by the user meets requirements for training a speech synthesis model includes:

judging whether a current piece of speech data entered by the user meets the recording quality requirement, in response to determining that the current piece of speech data entered by the user meets the recording quality requirement, obtaining a next piece of speech data entered by the user until the amount of speech data entered by the user meeting the recording quality requirement meets a preset amount requirement; and in response to determining that the current piece of speech data entered by the user does not meet the recording quality requirement, prompting the user to re-enter the current piece of speech data.

According to an embodiment of the present disclosure, the method may further include: before obtaining the speech data entered by the user, displaying voice class options on the speech recording interface; and obtaining the voice class information selected by the user and updating the voice class information to the server side to train the speech synthesis model.

According to an embodiment of the present disclosure, the uploading the speech data entered by the user to a server side in response to determining that the speech data entered by the user meets requirements for training a speech synthesis model may include:

displaying on the speech recording interface a component for uploading the speech data, in response to determining that the speech data entered by the user meets the requirements for training the speech synthesis model; and uploading the speech data entered by the user to the server side after obtaining an event of the user triggering the component for uploading the speech data.

According to an embodiment of the present disclosure, the method may further include:

displaying a downloading link of the speech packet, the downloading link including the downloading address of the speech packet; and downloading the speech packet from the server side after obtaining an event of the user triggering the downloading link, and integrating the speech packet to the client so that the client performs speech broadcast using the speech packet.

According to an embodiment of the present disclosure, the client performing speech broadcast using the speech packet may include:

sending a broadcast text and model parameters included in the speech packet to the server side, so that the server side performs speech synthesis with the text and the model parameters to obtain a broadcast speech; or invoking the speech synthesis model so that the speech synthesis model performs speech synthesis with the broadcast text and model parameters included in the speech packet to obtain the broadcast speech.

In a second aspect, the present disclosure provides a method for generating a speech packet, implemented in a server side, and the method may include:

obtaining speech data uploaded by a client, the speech data being entered by a user through a speech recording interface provided by the client;

training a speech synthesis model with the speech data to generate a speech packet, and the speech packet includes model parameters obtained by training the speech synthesis model; and sending a downloading address of the speech packet to the client.

According to an embodiment of the present disclosure, the method may further include:

sending the client a text sentence and/or a voicing sentence corresponding to the text sentence, so that the user enters speech data according to the preset text sentence and/or voicing sentence displayed on the client.

In a third aspect, the present disclosure provides an apparatus for generating a speech packet, disposed at a client, and the apparatus may include:

a displaying unit configured to provide a speech recording interface to a user;

a recording unit configured to, obtain speech data entered by the user after obtaining an event of triggering speech recording on the speech recording interface;

an uploading unit configured to upload the speech data entered by the user to a server side in response to determining that the speech data entered by the user meets requirements for training a speech synthesis model; and a receiving unit configured to receive a downloading address of the speech packet generated by the server side after training the speech synthesis model with the speech data.

According to an embodiment of the present disclosure, the displaying unit is further configured to display on the speech recording interface a preset text sentence and/or play a voicing sentence corresponding to the preset text sentence; and the recording unit obtains the speech data entered by the user according to the text sentence and/or voicing sentence displayed by the displaying unit.

According to an embodiment of the present disclosure, the displaying unit is further configured to display a downloading link of the speech packet, the downloading link including a downloading address of the speech packet; and the apparatus may further include:

a downloading unit configured to download the speech packet from the server side after obtaining an event of the user triggering the downloading link, and integrate the speech packet to the client so that the client performs speech broadcast using the speech packet.

According to an embodiment of the present disclosure, the apparatus may further include:

a broadcasting unit configured to send a broadcast text and model parameters included in the speech packet to the server side, so that the server side performs speech synthesis with the text and the model parameters to obtain a broadcast speech; or invoke the speech synthesis model so that the speech synthesis model performs speech synthesis with the broadcast text and model parameters included in the speech packet to obtain the broadcast speech.

In a fourth aspect, the present disclosure provides an apparatus for generating a speech packet, disposed at a server side, and the apparatus may include:

an obtaining unit configured to obtain speech data uploaded by the client, the speech data being entered by a user through a speech recording interface provided by the client;

a generating unit configured to train a speech synthesis model with the speech data to generate a speech packet, and the speech packet includes model parameters obtained by training the speech synthesis model;

a sending unit configured to send a downloading address of the speech packet to the client.

According to an embodiment of the present disclosure, the sending unit is further configured to send the client a text sentence and/or a voicing sentence corresponding to the preset text sentence, so that the user enters speech data according to the preset text sentence and/or voicing sentence displayed on the client.

In a fifth aspect, the present disclosure provides an electronic device, which includes:

at least one processor; and a storage communicatively connected with the at least one processor; wherein, the storage stores instructions executable by the at least one processor, and the instructions are executed by the at least one processor to enable the at least one processor to perform the above method.

In a sixth aspect, the present disclosure provides a non-transitory computer-readable storage medium storing computer instructions therein, wherein the computer instructions are used to cause the computer to perform the above method.

The above technical solutions according to the present disclosure have the following advantages:

1) an ordinary user may customize a personalized speech packet through the speech recording interface provided by the client, without using professional recording equipment, which may substantially reduce the production cost of the speech packet.

2) after completing the recording of the speech data through the speech recording interface provided by the client, the user uploads it to the server side, and the training of the speech synthesis model, generation of the speech packet file and the sending of the downloading address are all automatically performed by the server side. As compared with the need to get online manually in the prior art, the present disclosure may substantially shorten the production period. After testing, the user may complete the personalized customization of the speech packet by merely waiting a period of minute-level time.

3) In the present disclosure, the server side trains the speech synthesis model with the speech data uploaded by the client to generate the speech packet including model parameters. In a specific application process, the model parameters included in the speech packet and the broadcast text are used to invoke the speech synthesis model to obtain the broadcast speech. On contrary, in the existing broadcast manner based on speech concatenation, the corresponding speech packet includes speech segments. Hence, as compared with the prior art, the speech data to be entered in the present disclosure is reduced substantially, from the order of tens of thousands or thousands to the order of hundreds or tens, and even only twenty or thirty pieces of speech data are needed in the case of training the speech synthesis model in combination with prosody. Obviously, the efficiency is improved while the costs are substantially reduced.

4) On the speech recording interface according to the present disclosure, a manner of displaying the preset text sentence and/or voicing speech may be flexibly employed to facilitate the user to enter the speech data so that users of different ages, such as the elderly, children, persons with poor hearing and so on, may enter the speech data under different scenarios.

5) In the present disclosure, after the user enters the speech data, it is possible to obtain the speech recognition result by recognizing the speech data, and then compare the recognition result with the corresponding text sentence to judge whether the speech data meets the speech quality requirement. On the one hand, the speech quality may be detected conveniently, and on the other hand, for the server side, it may be believed that the received speech data corresponds to the preset text sentence, additional manual marking/annotation is not needed, and thus the manpower cost may be further saved.

6) After the speech packet is generated, the user only needs to click to download the speech packet; after successful download, the client automatically integrates the speech packet which gets effective at the client, so that the client automatically uses the integrated speech packet for speech broadcasting. The degree of automation is high, and the user's experience is enhanced.

Other effects of the present disclosure will be described hereinafter in conjunction with specific embodiments.

BRIEF DESCRIPTION OF THE DRAWINGS

The figures are intended to facilitate understanding the solutions, not to limit the present disclosure. In the figures.

DETAILED DESCRIPTION OF EMBODIMENTS

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
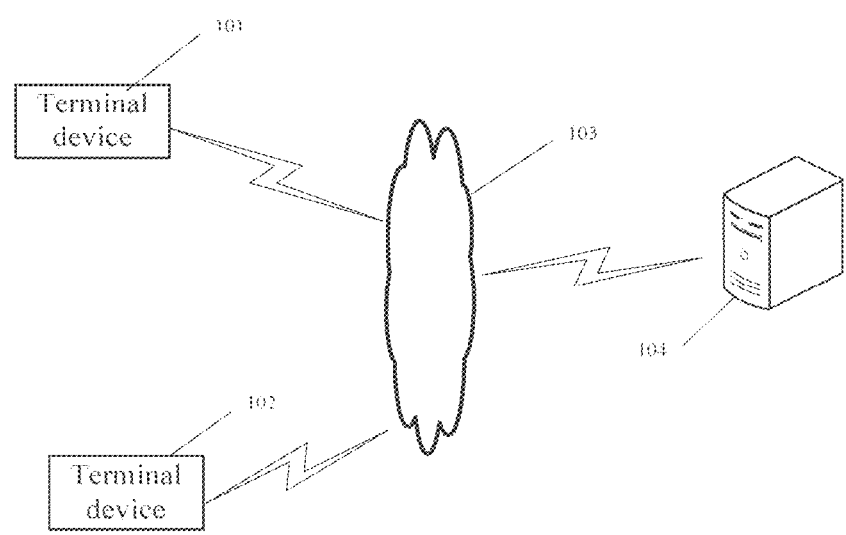
FIG. 1 illustrates a diagram of an exemplary system architecture which may be applied to embodiments of the present disclosure.

FIG. 1 illustrates an exemplary system architecture which may be applied to a method of generating a speech packet or an apparatus for generating a speech packet according to embodiments of the present disclosure.

As shown in FIG. 1, the system architecture may include terminal devices 101 and 102, a network 103 and a server 104. The network 103 is used to provide a medium for a communication link between the terminal devices 101, 102 and the server 104. The network 103 may include various connection types, such as wired connection, wireless communication link, or fiber optic cable, etc.

The user may interact with the server 104 via the network 103 by using the terminal devices 101 and 102. Various applications may be installed on the terminal devices 101 and 102, for example speech interaction applications, map-like applications, web browser applications, communication applications, and so on.

The terminal devices 101 and 102 may be various electronic devices that support speech entry (i.e., capable of collecting speech data entered by users) and speech broadcast. The terminal devices may include but not limited to smart phones, tablet computers, notebook computers, etc. The apparatus for generating a speech packet provided by the present disclosure may be disposed on and run on the above terminal device 101 or 102. It may be implemented as a plurality of software or software modules (for example, to provide distributed service) or as a single software or software module, which is not specifically limited herein.

For example, the apparatus for generating a speech packet is disposed on and runs on the terminal device 101, then the apparatus for generating the speech packet uploads the entered speech data to the server 104 in the manner provided by the embodiment of the present disclosure, and the apparatus for generating the speech packet on the server 104 generates the speech packet using the uploaded speech data for downloading by the apparatus for generating the speech packet on the terminal device 101.

The server 104 may be a single server or a server group composed of a plurality of servers. It should be understood that the numbers of terminal devices, networks, and servers in FIG. 1 are only illustrative. According to the needs in implementation, there can be any number of terminal devices, networks and servers.

To address the problems in the prior art such as high costs caused by invitation of specific persons and use of professional recording equipment, and failure to personalize and customize speech of ordinary users, a core idea of the present disclosure lies in that the client provides the user with a speech recording interface, obtains speech data entered by the user through the speech recording interface and meeting requirements for training a speech synthesis model and provides the speech data to the server side to generate the speech packet, and the server side provides a downloading address of the generated speech packet to the client, so that any ordinary user may use the client on his own terminal device to customize personalized speech packet. The process performed by the client and the process performed by the server will be respectively described in detail below in conjunction with embodiments.

Figure 2:
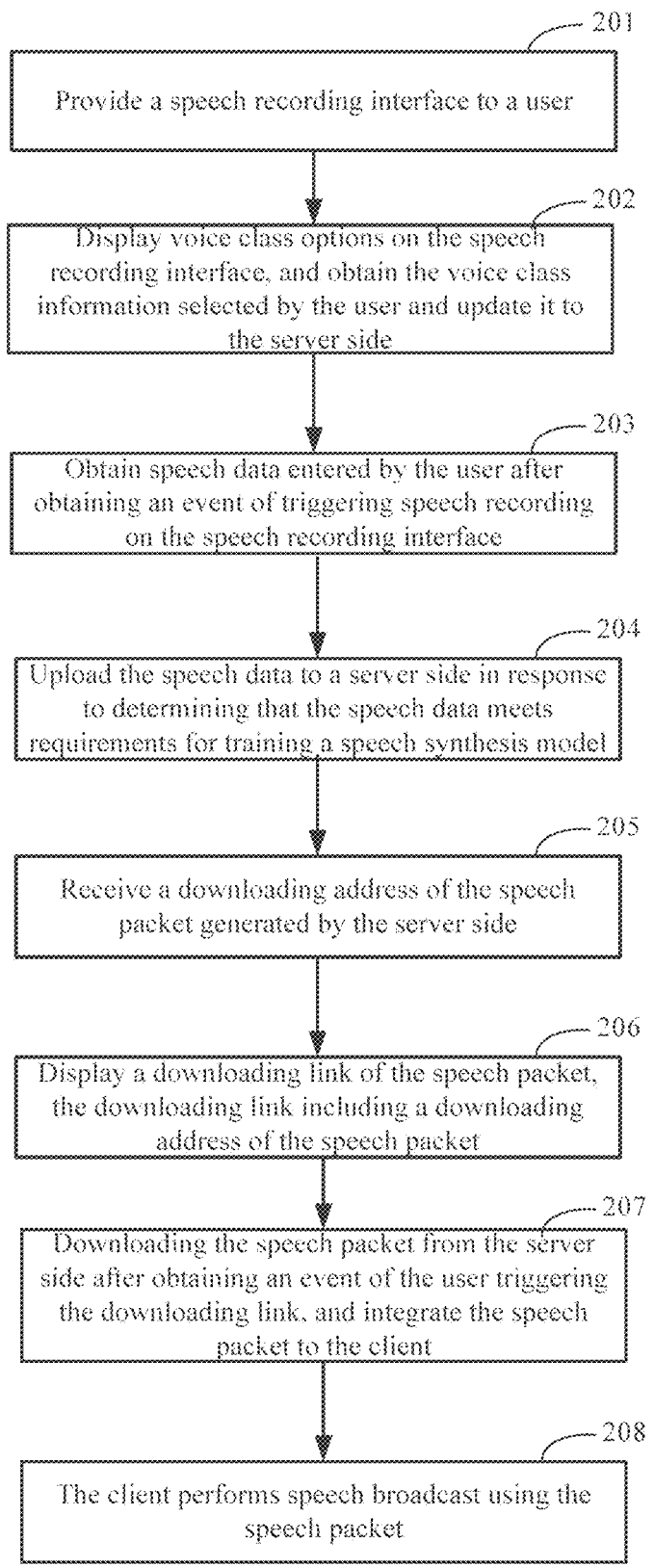
FIG. 2 illustrates a flow chart of a method performed by an apparatus disposed at a client according to an embodiment of the present disclosure.

FIG. 2 illustrates a flow chart of a method performed by an apparatus disposed at a client according to an embodiment of the present disclosure. The apparatus may be a separate client, or a functional unit such as a plug-in or Software Development Kit (SDK) in the client. As shown in FIG. 2, the method may include the following steps:

At 201, a speech recording interface is provided to the user.

When the user wants to customize a personalized speech packet, he may trigger the display of the speech recording interface by opening the client, or through a specific path of the client, or by clicking a specific component on the client interface. After the client provides the user with the speech recording interface, the user can customize the personalized speech packet through operations on the speech recording interface.

Figure 3A:
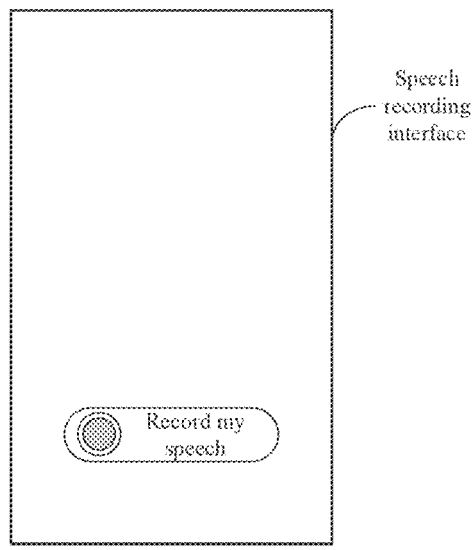
FIG. 3a-FIG. 3h illustrate schematic diagrams of stages of a speech recording interface according to embodiments of the present disclosure.
Figure 3B:
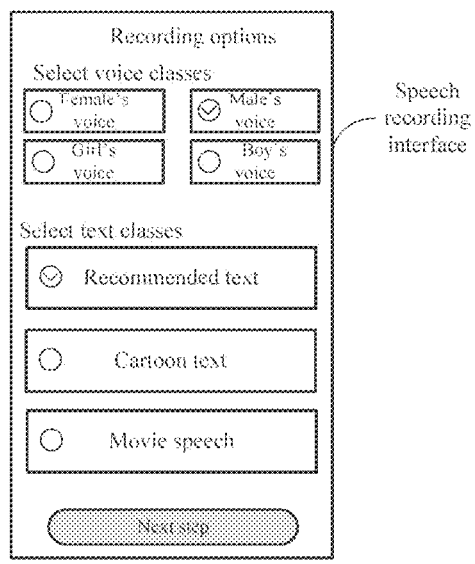

For example, it is assumed that after the user opens the client, the interface shown in FIG. 3a is displayed. The interface includes a "record my speech" component. After the user click the component, the speech recording interface shown in FIG. 3b is shown. In addition to the above component, the interface shown in FIG. 3a may further include for example a speech packet recording strategy, speech packet information already recorded by other users, and so on, which are not listed in FIG. 3a one by one.

At 202, voice class options are displayed on the speech recording interface, and the voice class information selected by the user is obtained and uploaded to the server side.

The voice class options may be related to the gender and/or age of the user participating the recording. For example, as shown in FIG. 3b, options such as "female's voice", "male's voice", "girl's voice" and "boy's voice" may be provided. The user participating the speech recording may select a voice class according to his/her own actual situations. Then, the client uploads the voice class information selected by the user to the server side to train the speech synthesis model.

It is to be noted that this step is not a necessary step of the present disclosure, but a preferred step. As for speech synthesis, the voice of persons of different genders and ages varies substantially. For example, a female's voice has a higher frequency than that of a male's voice, and acoustically corresponds to the difference in fundamental frequency features. Hence, it is possible to, by uploading the voice class option to the server side, enable the server to use different fundamental frequency feature parameters such as an upper limit and a lower limit of the fundamental frequency features for different voice types when the speech synthesis model is trained. In addition, when the speech synthesis model is trained, the speech data uploaded by the user is very limited. To improve the accuracy of the speech synthesis model, other users' speech data consistent with the user's speech class may be combined as data for training the speech synthesis model.

In addition, options of text classes may also be displayed on the current speech recording interface. The text involved therein refers to textual sentences based on which the user performs speech recording subsequently. To make it fun, in addition to the text recommended, other text class options such as cartoon text, movie speech and so on may also be provided for selection by the user, as shown in FIG. 3b.

At 203, after an event of triggering speech recording is obtained on the speech recording interface, speech data entered by the user is obtained.

In this step, the event of triggering speech recording may include but not limited to: detecting a gesture of triggering speech recording on the speech recording interface; or receiving a speech instruction of triggering speech recording from the user when the speech recording interface is displayed.

The most common way may include starting the entry of speech data after detecting that the user clicks and triggers the speech recording component on the speech recording interface. For example, the user clicks a "next step" button shown in FIG. 3b to enter the speech recording interface shown in FIG. 3c to start the entry of the speech data.

Figure 3C:
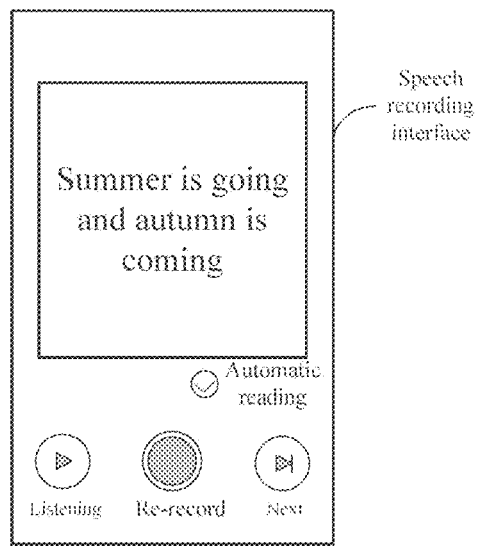

In this step, when the speech data entered by the user is obtained, preset text sentences may be displayed on the speech recording interface, and these text sentences may be text sentences corresponding to text classes selected by the user in 202. As shown in FIG. 3c, after the preset text sentence "summer is going and autumn is coming" is displayed, the user may enter the speech data according to the displayed text sentence. That is to say, the user reads the preset text sentence, and the terminal device collects the speed data read by the user.

As another implementation, while the preset text sentence is displayed, a voicing sentence corresponding to the preset text sentence may be played. For example, as shown in FIG. 3c, the user may select an "automatic reading" component therein to implement the voicing of the preset text sentence by the terminal device, or the user may also click a "listening" component therein to implement the voicing/reading demonstration of the text sentence by the terminal device. As for children, the elderly or persons with poor vision who have difficulty in reading words, they may enter the speech data according to the content which is read/voiced.

In addition, as for the current entered speech data, the user may click a "re-record" button to re-enter the speech data corresponding to the current text sentence. The user may also click a "next" component to enter speech data corresponding to a next piece of text sentence. Of course, it is also possible to, after entering the speech data corresponding to the current text sentence, automatically begin to display next piece of text sentence to enter next piece of speech data.

As for the display of the preset text sentences, text sentences that can cover as many syllables and syllable sequences as possible are set so that the server side, upon using the speech data to train the speech synthesis model, may achieve a better effect by completing the speech synthesis model with less speech.

At 204, the entered speech data are uploaded to the server side in response to determining that the speech data entered by the user meets requirements for training the speech synthesis model.

The requirements for training the speech synthesis model may include but not limited to at least one of the following: the speech data entered by the user meets a recording quality requirement, or the amount of the speech data entered by the user meets a preset amount requirement.

The recording quality requirement may involve voice clarity/unambiguous of speech data and accuracy of speech data. The detection of voice unambiguous is common and will not be detailed here. The detection of the accuracy of the speech data may be implemented using the displayed text sentences, i.e., after the user enters the speech data, he/she may obtain a speech recognition result of the speech data, and then compare the recognition result with the corresponding text sentence to determine whether the recognition result is accurate. The speech recognition of the speech data may be implemented by the client invoking a local speech recognition model of the terminal device, or implemented by the client sending the speech data to the server side which is capable of performing speech recognition.

For example, after the user enters one piece of speech data, the client judges whether the current piece of speech data meets the speech quality requirement, and if YES, obtains a next piece of speech data entered by the user until the amount of entered speech data meeting the speech quality requirement meet a preset amount requirement; if NO, the client may prompt the user to re-enter the current piece of speech data.

Figure 3D:
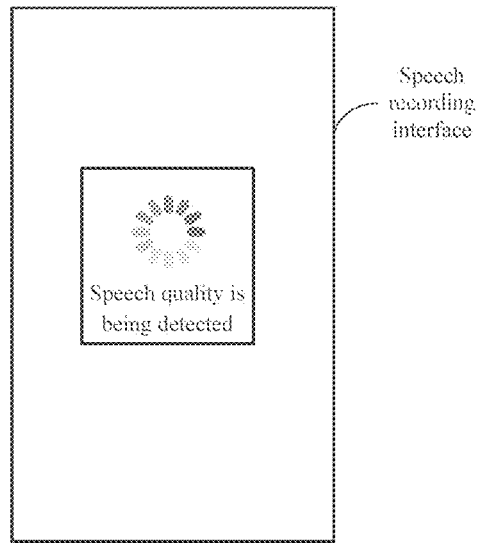
Figure 3E:
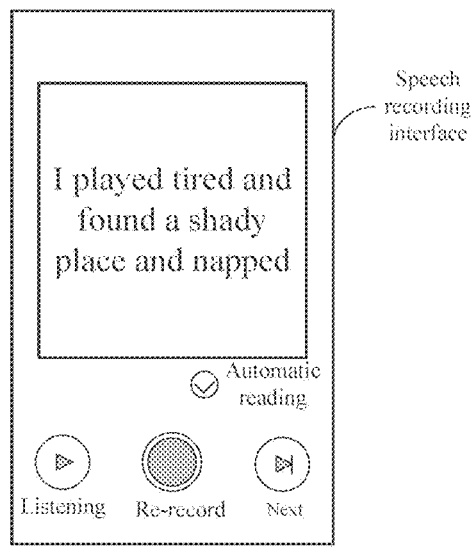

FIG. 3*d* shows an interface content that quality detection is being performed for the speech data. If the quality meets the requirement, the interface content shown in FIG. 3*e* will be displayed for entry of a next piece of speech data.

Figure 3F:
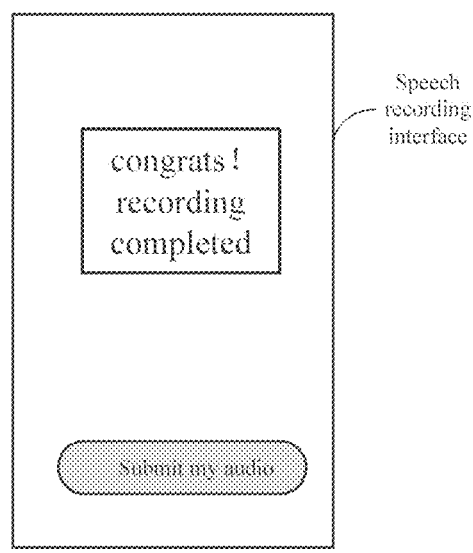

In addition, recording progress may be displayed on the speech recording interface according to the preset amount requirement and the amount of speech data already completed currently, so that the user learn about the information about the recording progress. After the speech data meeting the preset amount requirement is completed, a speech data-uploading component may be displayed on the speech recording interface. As shown in FIG. 3*f*, the speech data-uploading component "submit my audio" is displayed on the interface. After the event of triggering the component is obtained, the entered speech data is uploaded to the server side.

Figure 3G:
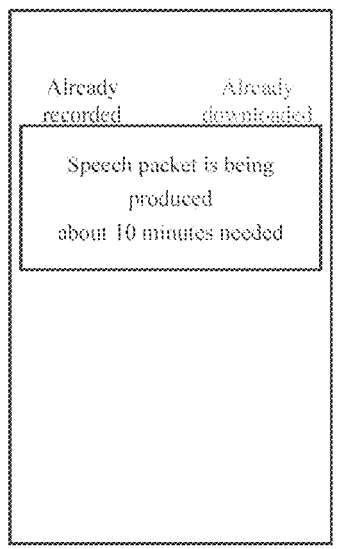

The processing performed by the server side will be described in the embodiment shown in FIG. 4. The server side can use the uploaded speech data to generate a speech packet, and send a downloading address of the speech packet to the client. While the server side generates the speech packet, the client may display, on the interface, information indicating that the speech packet is being generated, or may display estimated remaining time, as shown in FIG. 3*g*.

At 205, the downloading address of the speech packet generated by the server is received.

At 206, a downloading link of the speech packet is displayed, and the downloading link contains the downloading address of the speech packet.

Figure 3H:
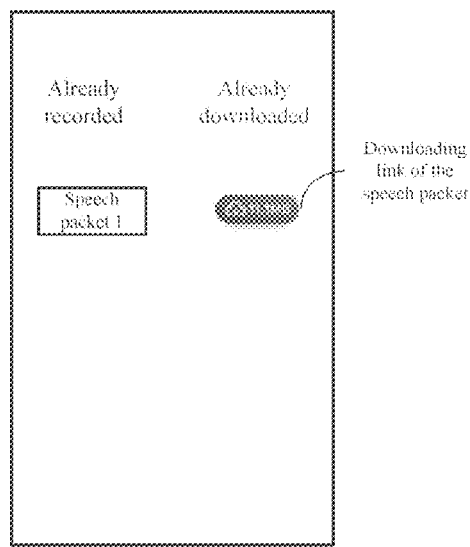

For example, as shown in FIG. 3*h*, the downloading link of the speech packet may be displayed so that the user may trigger the downloading.

At 207, after an event of triggering the downloading link is obtained, the speech packet is downloaded from the server side and integrated to the client.

The downloading and integration of the speech packet is the same as the downloading and integration manner of the speech packet in the prior art, and will not be detailed here.

At 208, the client performs speech broadcast using the speech packet.

Since the speech packet generated by the server side in fact include model parameters obtained after training the speech synthesis model. These model parameters may be understood as the personalized model parameters of the user who is recording speech data.

When the client performs speech broadcast, an online speech synthesis manner or an offline speech synthesis manner may be employed.

The online speech synthesis manner is: the client sends the broadcast text and model parameters included the speech packet to the server side, and the server side performs speech synthesis using the broadcast text and model parameters to obtain the broadcast speech.

The offline speech synthesis manner is: invoking the local speech synthesis model of the terminal device so that the speech synthesis model performs speech synthesis using the broadcast text and model parameters included by the speech packet to obtain the broadcast speech. The speech synthesis model may provide an invoking interface to the client, the client transfers parameters to the speech synthesis model in an invoking manner, and the transferred parameters include the broadcast text and model parameters. After completing speech synthesis by the speech synthesis model, the synthesized speech is returned to the client.

Figure 4:
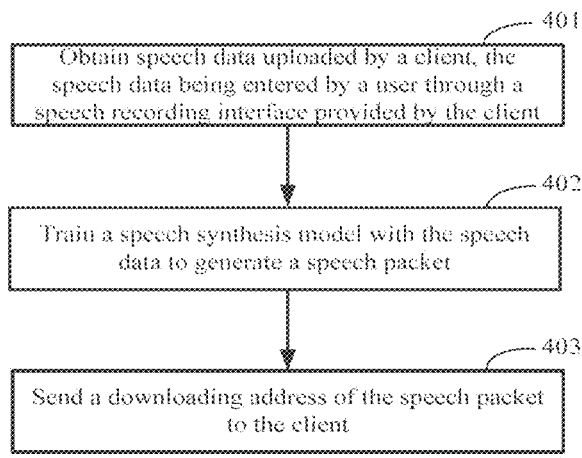
FIG. 4 illustrates a flow chart of a method performed by an apparatus disposed at a server side according to an embodiment of the present disclosure.

FIG. 4 illustrates a flow chart of a method performed by an apparatus disposed at the sever side according to an embodiment of the present disclosure. As shown in FIG. 4, the method may include the following steps:

At 401, speech data uploaded by the client is obtained, and the speech data is entered by the user through a speech recording interface provided by the client.

The process of the client uploading the speech data entered by the user may be found in the embodiment shown in FIG. 2. During the entry of the speech data, the server side may send the client a text sentence and/or a voicing sentence corresponding to the preset text sentence so that the user enters the speech data according to the preset text sentence and/or voicing sentence displayed/played by the client.

At 402, the speech data is used to train the speech synthesis model to generate the speech packet.

In the present disclosure, speech synthesis model is trained by taking the speech data entered by the user and uploaded by the client and its corresponding text sentence as training samples. The obtained speech synthesis model may output speech data having the user's acoustic features using the input text sentences. When the speech synthesis model is trained, prosody features may be fused so that the model can learn text-irrelevant changes in the voiceprint style. The model into which the prosody features are fused may substantially reduce the number of training samples needed by the model training.

In addition, since in the present disclosure, the user enters the speech data based on the displayed text sentence, and the client recognizes the entered speech data in a speech recognition manner and then compares the recognition result with the corresponding text sentence to determine whether the speech data meets the speech quality requirement, only the speech data meeting the quality requirement is uploaded. Hence, the server side may directly take the speech data and the corresponding text sentences as the training samples, and thus no additional manual marking/annotation is required, which further saves the manpower cost.

A specific process of training the speech synthesis model is not described in detail in the present disclosure. After the training of the speech synthesis model is completed, a speech packet is generated with the obtained model parameters. In other words, the generation of the speech packet in the present disclosure is not based on speech segments employed by a concatenated speech packet, but based on model parameters obtained by training the speech synthesis model.

At 403, the downloading address of the speech packet is sent to the client.

A specific application scenario is given as below:

After the user enters a navigation-like client, he may enter the speech recording interface of the client through a specific catalogue, and then enter the speech data in the manner described in the embodiment shown in FIG. 2. After the client uploads the speech data entered by the user to the server side, the server side trains the speech synthesis model in the manner described in the embodiment shown in FIG. 3 and generates the speech packet and sends it to the client. The model parameters included in the speech packet reflect voice features of the user recording the speech packet.

The user downloads the speech packet at the client and integrates it to the client. Then, when the user uses the client to perform navigation broadcast, the generated navigation broadcast text and the model parameters included by the speech packet may be used to perform speech synthesis to generate the broadcast speech. What is used in the broadcast speech is the user's own speech.

It may be seen that, firstly, the user may implement the recording of the personalized speech packet using his own terminal device such as a mobile phone or tablet computer, without using professional recording equipment. Secondly, the user needn't record a large number of speech segments for concatenation of speech broadcast, but only needs to record tens of pieces of speech data to implement the training of the speech synthesis model to obtain the speech packet, and the speech synthesis may be performed in real time using the speech packet and the broadcast text. Thirdly, any ordinary user may record a personalized speech packet, and the speech packet may even be customized using the voice of children, the elderly and so on.

The above describes the method according to the present disclosure in detail. An apparatus according to the present disclosure will be described in detail in conjunction with the embodiments.

Figure 5:
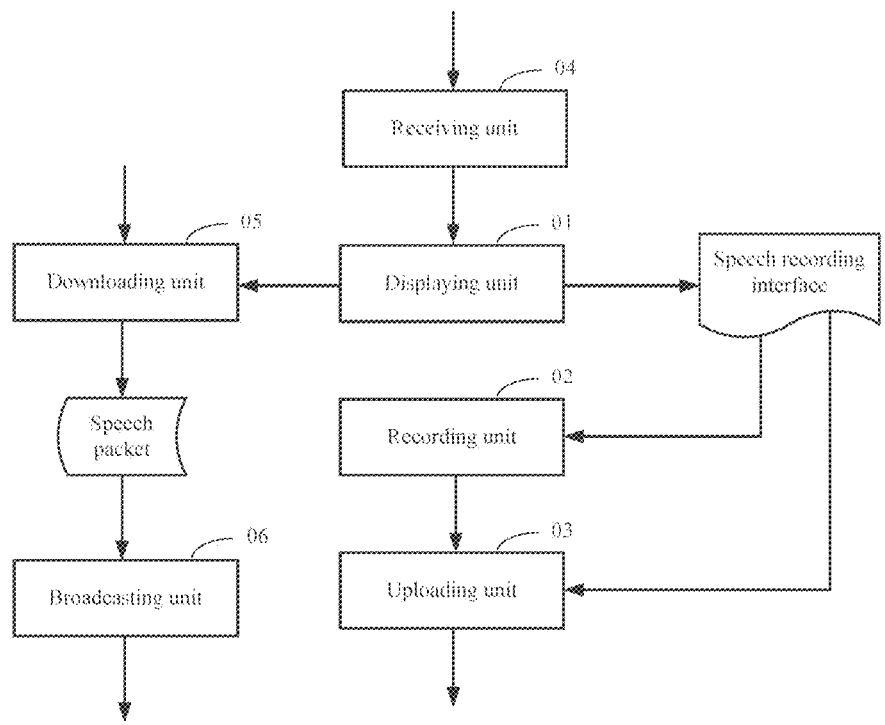
FIG. 5 illustrates a structural diagram of an apparatus disposed at a client according to an embodiment of the present disclosure.

FIG. 5 illustrates a structural diagram of an apparatus disposed at the client according to an embodiment of the present disclosure. As shown in FIG. 5, the apparatus may include: a displaying unit 01, a recording unit 02, an uploading unit 03 and a receiving unit 04, and may further include a downloading unit 05 and a broadcasting unit 06. Main functions of the units are as follows:

The displaying unit 01 is configured to provide a speech recording interface to the user.

The recording unit 02 is configured to obtain speech data entered by the user after obtaining an event of triggering speech recording on the speech recording interface.

The event of triggering speech recording may include: detecting a gesture of triggering speech recording on the speech recording interface; or receiving a speech instruction of the user triggering speech recording when the speech recording interface is displayed.

Preferably, the displaying unit 01 is further configured to display on the speech recording interface a preset text sentence and/play a voicing sentence corresponding to a text sentence. The recording unit 02 obtains speech data entered by the user according to the preset text sentence and/or voicing sentence displayed by the displaying unit 01.

Furthermore, the recording unit 02 is further configured to obtain a speech recognition result by recognizing the entered speech data; compare the speech recognition result with the corresponding text sentence to judge whether the entered speech data meets a recording quality requirement.

The uploading unit 03 is configured to upload the speech data entered by the user to the server side in response to determining that the speech data entered by the user meets requirements for training a speech synthesis model.

The requirements for training the speech synthesis model may include at least one of: the entered speech data meets a recording quality requirement, or the amount of the entered speech data meets a preset amount requirement.

The recording unit 02 is configured to judge whether the current entered piece of speech data meets the recording quality requirement, and if YES, obtain a next piece of speech data entered by the user until the amount of entered speech data meeting the recording quality requirement meet a preset amount requirement; if NO, prompt the user to re-enter the current piece of speech data.

As a preferred embodiment, before the recording unit 02 obtains the speech data entered by the user, voice class options may be displayed by the displaying unit 01 on the speech recording interface; the uploading unit 03 may obtain the voice class information selected by the user and upload it to the server side to train the speech synthesis model.

If the speech data entered by the recording unit 02 meets the requirements for training the speech synthesis model, the displaying unit 01 may display on the speech recording interface a component of uploading the speech data; the uploading unit 03 uploads the speech data entered by the user to the server side after obtaining an event of the user triggering the component of uploading the speech data.

The receiving unit 04 is configured to receive a downloading address of the speech packet generated by the server side after training the speech synthesis model with the speech data.

Furthermore, the displaying unit 01 may further display the downloading link of the speech packet, and the downloading link may include the downloading address of the speech packet. The downloading unit 05 downloads the speech packet from the server side after obtaining an event of the user triggering the downloading link, and integrates it to the client so that the client perform speech broadcast using the speech packet.

The broadcasting unit 06 is configured to send a broadcast text and model parameters included in the speech packet to the server side, so that the server side perform speech synthesis using the text and the model parameters to obtain a broadcast speech; or invoke a speech synthesis model so that the speech synthesis model performs speech synthesis with the broadcast text and model parameters included in the speech packet to obtain the broadcast speech.

Figure 6:
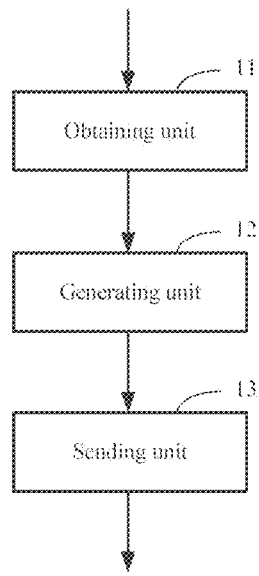
FIG. 6 illustrates a structural diagram of an apparatus disposed at a server side according to an embodiment of the present disclosure.

FIG. 6 illustrates a structural diagram of an apparatus disposed at the sever side according to an embodiment of the present disclosure. As shown in FIG. 6, the apparatus includes: an obtaining unit 11, a generating unit 12 and a sending unit 13. Main functions of the units are as follows:

The obtaining unit 11 is configured to obtain speech data uploaded by the client, and the speech data is entered by the user through a speech recording interface provided by the client.

The generating unit 12 is configured to train a speech synthesis model with the speech data to generate a speech packet, and the speech packet includes model parameters obtained by training the speech synthesis model.

In the present disclosure, the speech synthesis model is trained by taking the speech data entered by the user and uploaded by the client and its corresponding text sentence as training samples. The obtained speech synthesis model may output speech data having the user's acoustic features using the input text sentences. When the speech synthesis model is trained, prosody features may be fused so that the model may learn text-irrelevant changes in the voiceprint style. The model into which the prosody features are fused may substantially reduce the number of training samples needed by the model training.

In addition, since in the present disclosure, the user enters the speech data based on the displayed text sentence, and the client recognizes the entered speech data in a speech recognition manner and then compares the recognition result with the corresponding text sentence to determine whether the speech data meets the speech quality requirement, only the speech data meeting the quality requirement is uploaded. Hence, the server side may directly take the speech data and the corresponding text sentences as the training samples, and thus no additional manual marking/annotation is required, which further saves the manpower cost.

A specific process of training the speech synthesis model is not described in detail in the present disclosure. After the training of the speech synthesis model is completed, a speech packet is generated with the obtained model parameters. In other words, the generation of the speech packet in the present disclosure is not based on speech segments employed by a concatenated speech packet, but based on model parameters obtained by training the speech synthesis model.

The sending unit 13 is configured to send the downloading address of the speech packet to the client.

The sending unit 13 is also configured to send the client a text sentence and/or a voicing sentence corresponding to the preset text sentence, so that the user enters speech data according to the preset text sentence and/or voicing sentence displayed/played on the client.

According to embodiments of the present disclosure, the present disclosure further provides an electronic device and a readable storage medium.

Figure 7:
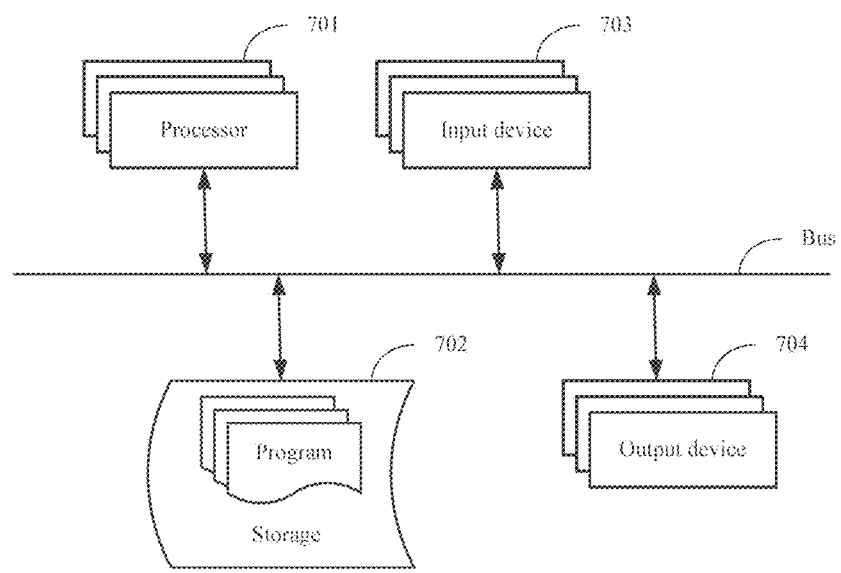
FIG. 7 illustrates a block diagram of an electronic device for implementing a method of generating a speech packet according to an embodiment of the present disclosure.

As shown in FIG. 7, it shows a block diagram of an electronic device for implementing the method of generating the speech packet according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosure described and/or claimed in the text here.

As shown in FIG. 7, the electronic device may include: one or more processors 701, a storage 702, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as display coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 701 is taken as an example in FIG. 7.

The storage 702 is a non-transitory computer-readable storage medium provided by the present disclosure. Wherein, the storage stores instructions executable by at least one processor, so that the at least one processor executes the method of generating the speech packet according to the present disclosure. The non-transitory computer-readable storage medium of the present disclosure stores computer instructions, which are used to cause a computer to execute the method of generating the speech packet provided by the present disclosure.

The storage 702 is a non-transitory computer-readable storage medium and can be used to store non-transitory software programs, non-transitory computer executable programs and modules, such as program instructions/modules corresponding to the method of generating the speech packet in the embodiments of the present disclosure. The processor 701 executes various functional applications and data processing of the server, i.e., implements the method of generating the speech packet in the above method embodiments, by running the non-transitory software programs, instructions and modules stored in the storage 702.

The storage 702 may include a storage program region and a storage data region, wherein the storage program region may store an operating system and an application program needed by at least one function; the storage data region may store data created according to the use of the electronic device for implementing the method of generating the speech packet according to the embodiments of the present disclosure. In addition, the storage 702 may include a high-speed random access memory, and may also include a non-transitory memory, such as at least one magnetic disk storage device, a flash memory device, or other non-transitory solid-state storage device. In some embodiments, the storage 702 may optionally include a storage remotely arranged relative to the processor 701, and these remote memories may be connected to the electronic device for implementing the method of generating the speech packet according to embodiments of the present disclosure through a network. Examples of the above network include, but are not limited to, the Internet, an intranet, a local area network, a mobile communication network, and combinations thereof.

The electronic device for implementing the method of generating the speech packet may further include an input device 703 and an output device 704. The processor 701, the storage 702, the input device 703 and the output device 704 may be connected through a bus or in other manners. In FIG. 7, the connection through the bus is taken as an example.

The input device 703 may receive inputted numeric or character information and generate key signal inputs related to user settings and function control of the electronic device for implementing the method of generating the speech packet, and may be an input device such as a touch screen, keypad, mouse, trackpad, touchpad, pointing stick, one or more mouse buttons, trackball and joystick. The output device 704 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for generating a speech packet, implemented in a client, wherein the method comprises:
    providing a speech recording interface to a user;
    obtaining speech data entered by the user after obtaining an event of triggering speech recording on the speech recording interface;
    uploading the speech data entered by the user to a server side in response to determining that the speech data entered by the user meets requirements for training a speech synthesis model; wherein the requirements for training the speech synthesis model comprises at least one of: the speech data entered by the user meets a recording quality requirement; or an amount of the speech data entered by the user meets a preset amount requirement; and
    receiving a downloading address of the speech packet generated by the server side after training the speech synthesis model with the speech data.

2. The method according to claim 1, wherein the event of triggering speech recording comprises at least one of:
    detecting a gesture of triggering speech recording on the speech recording interface; or
    receiving a speech instruction of triggering speech recording from the user when the speech recording interface is displayed.

3. The method according to claim 1, wherein the obtaining speech data entered by the user comprises:
    displaying on the speech recording interface a preset text sentence or playing a voicing sentence corresponding to the preset text sentence; and
    obtaining the speech data entered by the user according to the preset text sentence or voicing sentence displayed.

4. The method according to claim 3, further comprising:
    obtaining a speech recognition result by recognizing the speech data entered by the user; and
    comparing the speech recognition result with the preset text sentence to judge whether the speech data entered by the user meets a recording quality requirement.

5. The method according to claim 1, wherein the uploading the speech data entered by the user to a server side in response to determining that the speech data entered by the user meets requirements for training a speech synthesis model comprises:
    judging whether a current piece of speech data entered by the user meets the recording quality requirement,
    in response to determining that the current piece of speech data entered by the user meets the recording quality requirement, obtaining a next piece of speech data entered by the user until the amount of speech data entered by the user meeting the recording quality requirement meets a preset amount requirement; and
    in response to determining that the current piece of speech data entered by the user does not meet the recording quality requirement, prompting the user to re-enter the current piece of speech data.

6. The method according to claim 1, further comprising: before obtaining the speech data entered by the user,
    displaying voice class options on the speech recording interface; and
    obtaining voice class information selected by the user and updating the voice class information to the server side to train the speech synthesis model.

7. The method according to claim 1, wherein the uploading the speech data entered by the user to a server side in response to determining that the speech data entered by the user meets requirements for training a speech synthesis model comprises:
displaying on the speech recording interface a component for uploading the speech data, in response to determining that the speech data entered by the user meets the requirements for training the speech synthesis model; and
uploading the speech data entered by the user to the server side after obtaining an event of the user triggering the component for uploading the speech data.

8. The method according to claim 1, further comprising:
displaying a downloading link of the speech packet, wherein the downloading link includes the downloading address of the speech packet; and
downloading the speech packet from the server side after obtaining an event of the user triggering the downloading link, and integrating the speech packet to the client so that the client performs speech broadcast using the speech packet.

9. The method according to claim 8, wherein the client performing speech broadcast using the speech packet comprises one of:
sending a broadcast text and model parameters included in the speech packet to the server side, so that the server side performs speech synthesis with the broadcast text and the model parameters to obtain a broadcast speech; or
invoking the speech synthesis model so that the speech synthesis model performs speech synthesis with the broadcast text and model parameters included in the speech packet to obtain the broadcast speech.

10. A method for generating a speech packet, implemented in a server side, wherein the method comprises:
obtaining speech data uploaded by a client, wherein the speech data is entered by a user through a speech recording interface provided by the client and meets requirements for training a speech synthesis model; and wherein the requirements for training the speech synthesis model comprises at least one of: the speech data entered by the user meets a recording quality requirement; or an amount of the speech data entered by the user meets a preset amount requirement;
training the speech synthesis model with the speech data to generate a speech packet, wherein the speech packet includes model parameters obtained by training the speech synthesis model; and
sending a downloading address of the speech packet to the client.

11. The method according to claim 10, further comprising:
sending the client a text sentence or a voicing sentence corresponding to the text sentence, so that the user enters speech data according to the preset text sentence or voicing sentence displayed on the client.

12. An electronic device, implemented in a client side, wherein the electronic device comprises:
at least one processor; and
a storage communicatively connected with the at least one processor; wherein,
the storage stores instructions executable by the at least one processor, and the instructions are executed by the at least one processor to enable the at least one processor to perform a method for generating a speech packet, wherein the method comprises:
providing a speech recording interface to a user;
obtaining speech data entered by the user after obtaining an event of triggering speech recording on the speech recording interface;
uploading the speech data entered by the user to a server side in response to determining that the speech data entered by the user meets requirements for training a speech synthesis model; wherein the requirements for training the speech synthesis model comprises at least one of: the speech data entered by the user meets a recording quality requirement; or an amount of the speech data entered by the user meets a preset amount requirement; and
receiving a downloading address of the speech packet generated by the server side after training the speech synthesis model with the speech data.

13. The electronic device according to claim 12, wherein the obtaining speech data entered by the user comprises:
displaying on the speech recording interface a preset text sentence or playing a voicing sentence corresponding to the preset text sentence; and
obtaining the speech data entered by the user according to the preset text sentence or voicing sentence displayed.

14. The electronic device according to claim 12, wherein the method further comprising:
displaying a downloading link of the speech packet, wherein the downloading link includes the downloading address of the speech packet; and
downloading the speech packet from the server side after obtaining an event of the user triggering the downloading link, and integrating the speech packet to the client so that a client performs speech broadcast using the speech packet.

15. The electronic device according to claim 14, wherein the client performing speech broadcast using the speech packet comprises one of:
sending a broadcast text and model parameters included in the speech packet to the server side, so that the server side performs speech synthesis with the broadcast text and the model parameters to obtain a broadcast speech; or
invoking the speech synthesis model so that the speech synthesis model performs speech synthesis with the broadcast text and model parameters included in the speech packet to obtain the broadcast speech.

16. An electronic device, implemented in a server side, wherein the electronic device comprises:
at least one processor; and
a storage communicatively connected with the at least one processor; wherein,
the storage stores instructions executable by the at least one processor, and the instructions are executed by the at least one processor to enable the at least one processor to perform a method for generating a speech packet, wherein the method comprises:
obtaining speech data uploaded by a client, wherein the speech data is entered by a user through a speech recording interface provided by the client and meets requirements for training a speech synthesis model; and wherein the requirements for training the speech synthesis model comprises at least one of: the speech data entered by the user meets a recording quality requirement; or an amount of the speech data entered by the user meets a preset amount requirement;
training a speech synthesis model with the speech data to generate a speech packet, wherein the speech packet includes model parameters obtained by training the speech synthesis model; and sending a downloading address of the speech packet to the client.

17. The electronic device according to claim 16, wherein the method further comprises:

sending the client a text sentence or a voicing sentence corresponding to the text sentence, so that the user enters speech data according to the preset text sentence or voicing sentence displayed on the client.

18. A non-transitory computer-readable storage medium storing computer instructions therein, wherein the computer instructions are used to cause the computer to perform a method for generating a speech packet, wherein the method comprises:

providing a speech recording interface to a user;

obtaining speech data entered by the user after obtaining an event of triggering speech recording on the speech recording interface;

uploading the speech data entered by the user to a server side in response to determining that the speech data entered by the user meets requirements for training a speech synthesis model; wherein the requirements for training the speech synthesis model comprises at least one of: the speech data entered by the user meets a recording quality requirement; or an amount of the speech data entered by the user meets a preset amount requirement; and receiving a downloading address of the speech packet generated by the server side after training the speech synthesis model with the speech data.

19. A non-transitory computer-readable storage medium storing computer instructions therein, wherein the computer instructions are used to cause a computer to perform a method for generating a speech packet, implemented in a server side, wherein the method comprises:

obtaining speech data uploaded by a client, wherein the speech data is entered by a user through a speech recording interface provided by the client and meets requirements for training a speech synthesis model; and wherein the requirements for training the speech synthesis model comprises at least one of: the speech data entered by the user meets a recording quality requirement; or an amount of the speech data entered by the user meets a preset amount requirement;

training a speech synthesis model with the speech data to generate a speech packet, wherein the speech packet includes model parameters obtained by training the speech synthesis model; and sending a downloading address of the speech packet to the client.

\* \* \* \* \*